J. REDMAN.
Plow-Attachment.
No. 197,665. Patented Nov. 27, 1877.
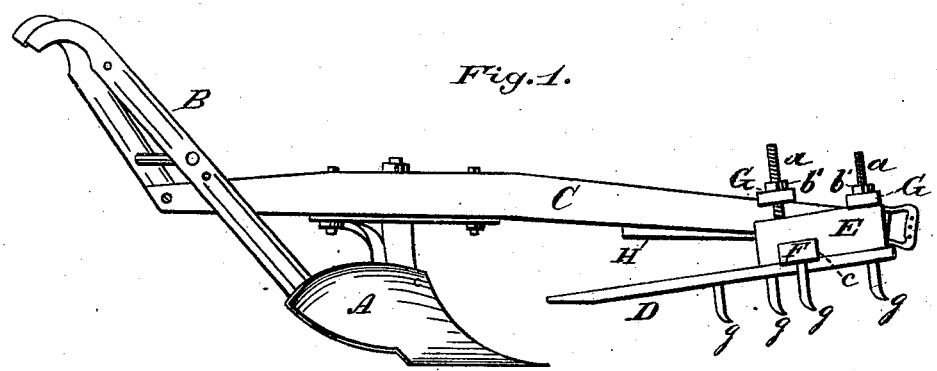
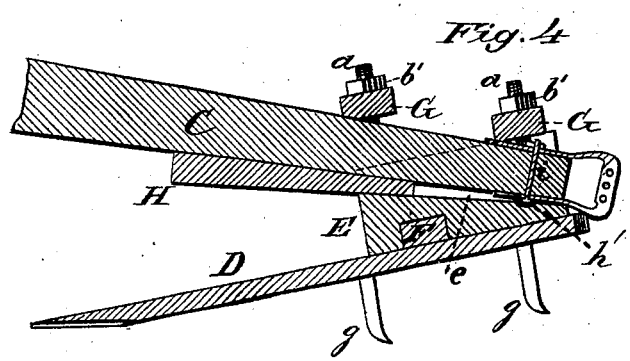
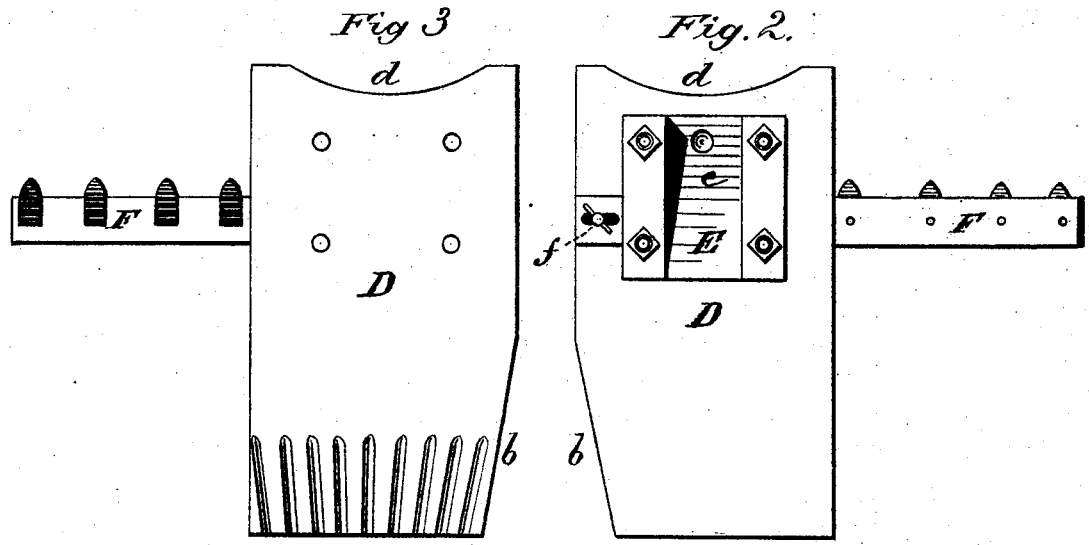
Attest:
M. S. Ditmer.
Jno. P. Brooks
Inventor:
Joseph Redman
by Louis Bagger & Co.
Att'ys.

UNITED STATES PATENT OFFICE.

JOSEPH REDMAN, OF SOUTH CARROLLTON, KENTUCKY.

IMPROVEMENT IN PLOW ATTACHMENTS.

Specification forming part of Letters Patent No. 197,665, dated November 27, 1877; application filed October 12, 1877.

*To all whom it may concern:*

Be it known that I, JOSEPH REDMAN, of South Carrollton, in the county of Muhlenburg, and State of Kentucky, have invented certain new and useful Improvements in Attachments to Plows; and I do hereby declare that the following is a full, clear, and exact description thereof, which will enable others skilled in the art to which it appertains to make and use the same, reference being had to the accompanying drawings, which form a part of this specification.

Figure 1 is a side elevation of a plow provided with my attachment. Fig. 2 is a top plan on an enlarged scale, the plow-beam being broken off. Fig. 3 is a view of the under side of the attachment and Fig. 4 is a vertical longitudinal section.

Similar letters of reference indicate corresponding parts in all the figures.

My invention relates to rake attachments for plows; and has for its object to provide a means to rake down the weeds in front of the plow, and thus facilitate the operation of plowing, especially in places where the weeds are growing high and abundantly.

It consists in the construction and arrangement of such rake attachment, substantially as hereinafter more fully described.

In the drawing, A B C is the plow, which may be of any suitable construction.

D is the rake-board of my improved attachment, which is, preferably, made of heavy boiler-iron, and corrugated at its rear end, where it is adjusted above the point of the share A, so as to regulate the depth of the furrow. One or both of the rear corners of the rake-board D may be cut off, as shown at $h$.

The front end of the board has a crescent-shaped cut, $d$, and upon the top or upper side of D is secured a wooden block, E, through the corners of which pass four bolts, $a\ a\ a\ a$.

Block E has a slot or recess, $c$, running crosswise on its under side, and a wedge-shaped or beveled cut, $e$, in its upper side or face, sloping downward to the curved front part of the rake-board, between the bolts $a\ a\ a\ a$.

F is an auxiliary rake, which is inserted into the slot $c$, and may be adjusted, so as to project a longer or shorter distance from the board, by a thumb-screw, $f$. By removing or loosening this screw altogether, the rake F may be reversed and inserted into the opposite side of the slot, according to whether a right-handed or left-handed plow is used.

The under side of the rake-board D and the auxiliary rake F are provided with any suitable number of teeth or cutters, $g\ g$; and the attachment is secured upon the plow in the following manner: The plow-beam or tongue C is inserted into the sloping cut $e$ in block E, and the clevis-pin inserted into a hole, $h$, in block E, near the front end of the slope. It is then held in place by two clamps, G G, having perforations which fit over the bolts $a$, and which are tightened down by the nuts $b'\ b'\ b'\ b'$.

To regulate the slant or inclination of the rake-board D, I employ a wedge, H, which is screwed onto the under side of the front end of the plow-beam, back of the clevis, and has a slot which straddles the clevis-pin $i$.

This rake attachment is simple in construction, and, therefore, strong and durable. It may be applied to any plow in a few minutes, and will effectually clear the field of weeds. As the team progresses, the weeds are caught by the curved front end or guide of the board and carried in under this, where they are cut up by the teeth or cutters $g$, so as to be readily covered by the soil which is turned by the share and mold-board, the corrugated rear end of the rake-board letting out the weeds in under the plow. The projecting auxiliary rake F partly cuts and levels the weeds on the side of the plow, so as to facilitate the progress of the team at the next round.

Having thus described my invention, I claim and desire to secure by Letters Patent of the United States—

1. The rake attachment for plows herein described, consisting of the rake-board D, armed with teeth $g$, block E, having slot $c$, and beveled cut or recess $e$, bolts $a\ a\ a\ a$, clamps G G, nuts $b'\ b'\ b'\ b'$, and auxiliary rake E, all constructed and combined to operate substantially as and for the purpose herein shown and specified.

2. In combination with the plow A B C, the rake attachment herein described, consisting essentially of the parts D E F G G and adjusting-wedge H, substantially as and for the purpose herein shown and specified.

In testimony that I claim the foregoing as my own I have hereto affixed my signature in presence of two witnesses.

JOSEPH  his X  REDMAN.
mark.

Witnesses:
  JAMES BUCHANAN,
  ANDREW JOHNSON.